United States Patent
Kinoshita et al.

(10) Patent No.: US 11,811,059 B2
(45) Date of Patent: Nov. 7, 2023

(54) NONAQUEOUS ELECTROLYTE SECONDARY BATTERY

(71) Applicant: SANYO Electric Co., Ltd., Daito (JP)

(72) Inventors: Masahiro Kinoshita, Tokushima (JP); Kaoru Nagata, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 660 days.

(21) Appl. No.: 16/979,373

(22) PCT Filed: Feb. 7, 2019

(86) PCT No.: PCT/JP2019/004360
§ 371 (c)(1),
(2) Date: Sep. 9, 2020

(87) PCT Pub. No.: WO2019/176389
PCT Pub. Date: Sep. 19, 2019

(65) Prior Publication Data
US 2020/0411860 A1    Dec. 31, 2020

(30) Foreign Application Priority Data
Mar. 13, 2018    (JP) .................. 2018-045649

(51) Int. Cl.
*H01M 4/525* (2010.01)
*H01M 10/0525* (2010.01)
(Continued)

(52) U.S. Cl.
CPC ....... *H01M 4/525* (2013.01); *H01M 10/0525* (2013.01); *H01M 10/0568* (2013.01);
(Continued)

(58) Field of Classification Search
CPC ............. H01M 4/525; H01M 10/0525; H01M 10/0568; H01M 10/0569; H01M 2300/0034; H01M 2300/004
(Continued)

(56) References Cited

U.S. PATENT DOCUMENTS

| | | |
|---|---|---|
| 2013/0260262 A1 | 10/2013 | Miyazaki et al. |
| 2015/0228974 A1 | 8/2015 | Kokado et al. |

(Continued)

FOREIGN PATENT DOCUMENTS

| | | |
|---|---|---|
| JP | 2002-075367 A | 3/2002 |
| JP | 2010-040383 A | 2/2010 |

(Continued)

OTHER PUBLICATIONS

Extended (Supplementary) European Search Report dated Mar. 12, 2021, issued in counterpart EP application No. 19768431.9. (7 pages).

(Continued)

*Primary Examiner* — James M Erwin
(74) *Attorney, Agent, or Firm* — WHDA, LLP

(57) ABSTRACT

An object of the present disclosure is to provide a nonaqueous electrolyte secondary battery that can suppress lowering in capacity due to high-temperature storage of the battery. The nonaqueous electrolyte secondary battery (10) includes: a positive electrode (11) containing one or more positive electrode active materials; a negative electrode (12); and a nonaqueous electrolyte containing a fluorine compound, where: the positive electrode active materials include a complex oxide A containing Li, Ni, and W and a complex oxide B containing Li, Ni, and W as an optional element; W content in the complex oxide A is 5 mol % or more; W content in the complex oxide B is 0.5 mol % or less; and a mass ratio of the complex oxide A is 0.002% or more and 0.1% or less relative to the total of the complex oxide A and the complex oxide B.

4 Claims, 1 Drawing Sheet

(51) Int. Cl.
*H01M 10/0568* (2010.01)
*H01M 10/0569* (2010.01)

(52) U.S. Cl.
CPC .. *H01M 10/0569* (2013.01); *H01M 2300/004* (2013.01); *H01M 2300/0034* (2013.01)

(58) Field of Classification Search
USPC ........................................................ 429/199
See application file for complete search history.

(56) References Cited

U.S. PATENT DOCUMENTS

2017/0084916 A1    3/2017   Oka et al.
2018/0226646 A1*   8/2018   Furuichi ................ C01G 53/50
2018/0287143 A1   10/2018   Ozaki et al.
2018/0315997 A1*  11/2018   Kondo ................ H01M 4/1391
2019/0020023 A1*   1/2019   Yokoyama ............. H01M 4/62

FOREIGN PATENT DOCUMENTS

| JP | 2012-079464 A | 4/2012 |
| JP | 2013-137947 A | 7/2013 |
| JP | 2014-183031 A | 9/2014 |
| JP | 2016-111000 A | 6/2016 |
| JP | 2017-117766 A | 6/2017 |
| WO | 2015/141179 A1 | 9/2015 |
| WO | 2016/067522 A1 | 5/2016 |
| WO | 2017/150020 A1 | 9/2017 |

OTHER PUBLICATIONS

International Search Report dated Mar. 12, 2019, issued in counterpart application No. PCT/JP2019/004360, with English translation. (4 pages).

* cited by examiner

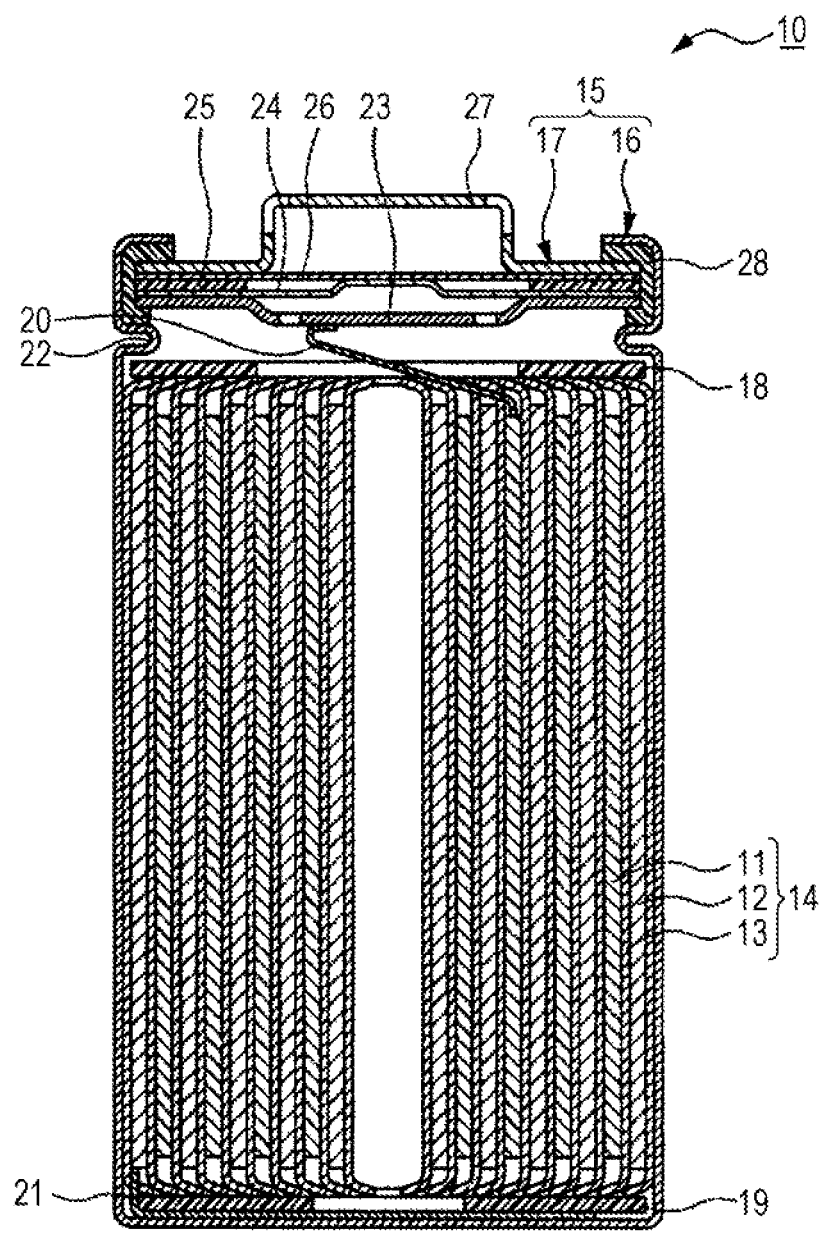

NONAQUEOUS ELECTROLYTE SECONDARY BATTERY

TECHNICAL FIELD

The present invention relates to a nonaqueous electrolyte secondary battery.

BACKGROUND ART

As a secondary battery with high output and high energy density, a nonaqueous electrolyte secondary battery that includes a positive electrode, a negative electrode, and a nonaqueous electrolyte and that charges/discharges through the movement of lithium ions or the like between the positive electrode and the negative electrode has been widely used in recent years.

Lithium nickel complex oxide, lithium cobalt complex oxide, lithium manganese complex oxide, and so forth are known as positive electrode active materials used for the positive electrode of such a nonaqueous electrolyte secondary battery. Among these oxides, lithium nickel complex oxide is a promising positive electrode active material that enables manufacture of an inexpensive high-capacity battery compared with lithium cobalt complex oxide and the like.

For example, Patent Literature (PTL) 1 to 3 propose a nonaqueous electrolyte secondary battery that uses, for the purpose of improving battery characteristics and so forth, lithium nickel complex oxide containing tungsten as a positive electrode active material.

CITATION LIST

Patent Literature

PTL 1: Japanese Published Unexamined Patent Application No. 2002-75367
PTL 2: Japanese Published Unexamined Patent Application No. 2012-79464
PTL 3: International Publication No. 2015/141179

SUMMARY OF INVENTION

Technical Problem

In a nonaqueous electrolyte secondary battery that uses a nonaqueous electrolyte containing a fluorine compound, the fluorine compound decomposes during high-temperature storage, thereby generating hydrogen fluoride in some cases. The generated hydrogen fluoride triggers side reactions that involve dissolution of transition metals from a positive electrode active material, thereby lowering battery capacity in some cases. Such lowering in capacity due to high-temperature storage of a battery is noticeable in lithium nickel complex oxide.

Accordingly, an object of the present disclosure is to provide, as a nonaqueous electrolyte secondary battery that uses one or more positive electrode active materials including lithium nickel complex oxide as well as a nonaqueous electrolyte containing a fluorine compound, a nonaqueous electrolyte secondary battery that can suppress lowering in capacity due to high-temperature storage of the battery.

Solution to Problem

A nonaqueous electrolyte secondary battery of an embodiment of the present disclosure is characterized by including: a positive electrode containing one or more positive electrode active materials; a negative electrode; and a nonaqueous electrolyte containing a fluorine compound, where: the positive electrode active materials include a complex oxide A containing Li, Ni, and W and a complex oxide B containing Li, Ni, and W as an optional element; W content in the complex oxide A is 5 mol % or more; W content in the complex oxide B is 0.5 mol % or less; and a mass ratio of the complex oxide A is 0.002% or more and 0.1% or less relative to the total of the complex oxide A and the complex oxide B.

Advantageous Effects of Invention

According to the embodiment of the present disclosure, it is possible, in a nonaqueous electrolyte secondary battery that uses one or more positive electrode active materials including lithium nickel complex oxide as well as a nonaqueous electrolyte containing a fluorine compound, to suppress lowering in capacity due to high-temperature storage of the battery.

BRIEF DESCRIPTION OF DRAWINGS

FIG. 1 is a cross-sectional view of a nonaqueous electrolyte secondary battery of an exemplary embodiment.

DESCRIPTION OF EMBODIMENTS

As a result of intensive studies, the present inventors found that lithium nickel complex oxide containing a predetermined amount or more of W has a high ability to trap hydrogen fluoride generated through decomposition of a fluorine compound in a nonaqueous electrolyte during high-temperature storage of the battery, thereby conceiving a nonaqueous electrolyte secondary battery of an embodiment described hereinafter.

A nonaqueous electrolyte secondary battery of an embodiment of the present disclosure is characterized by including: a positive electrode containing one or more positive electrode active materials; a negative electrode; and a nonaqueous electrolyte containing a fluorine compound, where: the positive electrode active materials include a complex oxide A containing Li, Ni, and W and a complex oxide B containing Li, Ni, and W as an optional element; W content in the complex oxide A is 5 mol % or more; W content in the complex oxide B is 0.5 mol % or less; and a mass ratio of the complex oxide A is 0.002% or more and 0.1% or less relative to the total of the complex oxide A and the complex oxide B.

According to the nonaqueous electrolyte secondary battery of the embodiment of the present disclosure, hydrogen fluoride generated during high-temperature storage of the battery is presumably trapped efficiently by the complex oxide A containing 5 mol % or more of W. Here, transition metals in the complex oxide A is dissolved out by trapped hydrogen fluoride. Accordingly, as the content of the complex oxide A increases, the amount of transition metals dissolved out increases. Consequently, the capacity tends to decrease during high-temperature storage of the battery. However, by setting the mass ratio of the complex oxide A to 0.002% or more and 0.1% or less relative to the total of the complex oxide A containing 5 mol % or more of W and the complex oxide B containing 0.5 mol % or less of W as in the nonaqueous electrolyte secondary battery of the embodiment of the present disclosure, it is possible to efficiently trap hydrogen fluoride by the complex oxide A in an extremely small ratio, to dissolve transition metals primarily from the complex oxide A while suppressing dissolution of transition metals from the complex oxide B in a large ratio, and as a result, to reduce the total amount of transition metals to be dissolved out. Consequently, lowering in battery capacity due to high-temperature storage of the battery is considered to be suppressed. Meanwhile, the initial capacity of a battery tends to decrease as the ratio of die complex oxide A containing 5 mol % or more of W increases. However, the nonaqueous electrolyte secondary battery of the embodiment of the present disclosure can also suppress lowering in initial capacity of the battery since the ratio of the complex oxide A containing 5 mol % or more of W is extremely small.

Hereinafter, an exemplary embodiment will be described in detail. Since the drawing referred to in the description of the embodiment is schematically illustrated, dimensional ratios and the like of the components in the drawing are different from actual ones in some cases.

FIG. 1 is a cross-sectional view of a nonaqueous electrolyte secondary battery of an exemplary embodiment. The nonaqueous electrolyte secondary battery 10 illustrated in FIG. 1 includes: a rolled electrode assembly 14 formed by rolling a positive electrode 11 and a negative electrode 12 via a separator 13; a nonaqueous electrolyte; insulating plates 18 and 19 disposed on the top and the bottom of the electrode assembly 14, respectively; and a battery case 15 that houses the above-mentioned members. The battery case 15 is formed from a flat-bottomed cylindrical case body 16 and a seal 17 for closing an opening of the case body 16. In place of the rolled electrode assembly 14, electrode assemblies in other forms, such as a stacked electrode assembly formed by alternately stacking positive electrodes and negative electrodes via separators, may be employed. Moreover, examples of the battery case 15 include metal cases, for example, of cylindrical, prismatic, coin, and button shapes; and resin cases (laminate batteries) formed by laminating resin sheets.

The case body 16 is a flat-bottomed cylindrical metal container, for example. Between the case body 16 and the seal 17, a gasket 28 is provided to ensure sealing of the inside of the battery. The case body 16 has an overhang 22 that is formed, for example, from a part of the side surface extending inward and that supports the seal 17. The overhang 22 is preferably formed circularly in the circumferential direction of the case body 16 and supports the seal 17 by its upper surface.

The seal 17 has a stacked structure of a filter 23, a lower valve 24, an insulator 25, an upper valve 26, and a cap 27 in this order from the side of the electrode assembly 14. Each member that constitutes the seal 17 has a disk or ring shape, for example, and these members excluding the insulator 25 are electrically connected to each other. The lower valve 24 and the upper valve 26 are mutually connected in the respective central portions, and the insulator 25 is disposed between the peripheries of these valves. When the internal pressure increases due to heat generation by an internal short circuit or the like, the lower valve 24, for example, deforms to push the upper valve 26 upward to the side of the cap 27 and fractures, thereby breaking the current path between the lower valve 24 and the upper valve 26. When the internal pressure further increases, the upper valve 26 fractures, thereby releasing gas from an opening of the cap 27.

In the nonaqueous electrolyte secondary battery 10 illustrated in FIG. 1, a positive electrode lead 20 attached to the positive electrode 11 extends in a through hole of the insulating plate 18 to the side of the seal 17 whereas a negative electrode lead 21 attached to the negative electrode 12 extends outside the insulating plate 19 to the bottom side of the case body 16. The positive electrode lead 20 is connected, by welding or the like, to the lower surface of the filter 23, which is a bottom plate of the seal 17, and the cap 27, which is a top plate of the seal 17 electrically connected to the filter 23, constitutes a positive electrode terminal. Meanwhile, the negative electrode lead 21 is connected, by welding or the like, to the inner bottom surface of the case body 16, and the case body 16 constitutes a negative electrode terminal.

Hereinafter, the positive electrode 11, the negative electrode 12, the separator 13, and the nonaqueous electrolyte will be described in detail.

<Positive Electrode>

The positive electrode 11 is composed of a positive electrode current collector, such as a metal foil, and a positive electrode active material layer formed on the positive electrode current collector. For the positive electrode current collector, a foil of a metal that is stable in a potential range of the positive electrode, such as aluminum, a film having such a metal disposed as a surface layer, and so forth may be used. The positive electrode active material layer contains one or more positive electrode active materials, a binder, and a conductive agent, for example.

The positive electrode 11 is obtained, for example, by applying a positive electrode mixture slurry containing one or more positive electrode active materials, a binder, a conductive agent, and so forth onto a positive electrode current collector; drying to form a positive electrode active material layer on the positive electrode current collector; and rolling the positive electrode active material layer.

The positive electrode active materials include a complex oxide A containing Li, Ni, and W and a complex oxide B containing Li, Ni, and W as an optional element.

W content in the complex oxide A is not particularly limited provided that it is 5 mol % or more. However, 7 mol % or more is preferable, for example, from a viewpoint of trapping hydrogen fluoride further efficiently. The upper limit of W content in the complex oxide A is preferably 20 mol % or less from a viewpoint of allowing efficient charge/discharge reactions, for example. W content in the complex oxide A is determined, for example, by dissolving the complex oxide A with a heated acid solution and analyzing the resulting solution by inductively coupled plasma-atomic emission spectrometry (ICP-AES).

The complex oxide A is preferably represented by a general formula of $Li_xNi_{1-y-z}W_yM_zO_{2-\gamma}$ from a viewpoint of enhancing the initial capacity of the battery, for example. In the formula, M is at least one element selected from transition metal elements excluding Ni and W, group 2 elements, and group 13 elements; $0.85 \leq x \leq 1.05$; $0.05 \leq y \leq 0.2$; $0.01 \leq z \leq 0.5$; and $-0.2 \leq \gamma \leq 0.2$.

Examples of the transition metal elements excluding Ni and W contained in the complex oxide A include Co, Mn, Zr, Mo, Cr, V, Ti, and Fe. Among these elements, Co and Mn are preferable, for example, from a viewpoint of stabilizing the crystal structure of the positive electrode active materials. Among group 2 elements of Be, Mg, Ca, Sr, Ba, and Ra, Mg and Ca are preferable, for example, from a viewpoint of extending the lifetime of the battery. Among group 13 elements of B, Al, Ga, In, Tl, and Nh, Al is preferable, for example, from a viewpoint of enhancing thermal stability of the positive electrode active materials.

W content in the complex oxide B is not particularly limited provided that it is 0.5 mol % or less. However, 0.1 mol % or more and 0.5 mol % or less is preferable, for example, from a viewpoint of suppressing deterioration in charge/discharge cycle characteristics of the battery. In the same manner as described above, W content in the complex oxide B is also determined through analysis by inductively coupled plasma-atomic emission spectrometry (ICP-AES).

The complex oxide B is preferably represented by a general formula of $Li_xNi_{1-y-z}W_yM_zO_{2-\gamma}$ from a viewpoint of suppressing deterioration in charge/discharge cycle characteristics of the battery, for example. In the formula, M is at least one element selected from transition metal elements excluding Ni and W, group 2 elements, and group 13 elements; $0.85 \leq x \leq 1.05$; $0.002 \leq y \leq 0.05$; $0.01 \leq z \leq 0.5$; and $-0.2 \leq \gamma \leq 0.2$.

Examples of the transition metal elements excluding Ni and W contained in the complex oxide B include Co, Mn, Zr, Mo, Cr, V, Ti, and Fe. Among these elements, Co and Mn are preferable, for example, from a viewpoint of stabilizing the crystal structure of the positive electrode active materials. Among group 2 elements of Be, Mg, Ca, Sr, Ba, and Ra, Mg and Ca are preferable, for example, from a viewpoint of extending the lifetime of the battery. Among group 13 elements of B, Al, Ga, In, Tl, and Nh, Al is preferable, for example, from a viewpoint of enhancing thermal stability of the positive electrode active materials.

A mass ratio of the complex oxide A is 0.002% or more and 0.1% or less and preferably 0.02% or more and 0.08% or less relative to the total of the complex oxide A and the complex oxide B from a viewpoint of suppressing lowering in capacity due to high-temperature storage of the battery.

The content of the complex oxide A relative to the total of the positive electrode active materials is preferably 0.002% by mass or more and 0.1% by mass or less and more preferably 0.02% by mass or more and 0.08% by mass or less from a viewpoint of further suppressing lowering in capacity due to high-temperature storage of the battery, for example. Meanwhile, the content of the complex oxide B relative to the total of the positive electrode active materials is preferably 50% by mass or more and 99.998% by mass or less and more preferably 70% by mass or more and 99.998% by mass or less from a viewpoint of enhancing the initial capacity of the battery, for example. Here, the positive electrode active materials may include lithium complex oxide other than the complex oxides A and B and may include, for example, Ni-free Li complex oxide, such as $LiCoO_2$ or $LiMn_2O_4$.

Hereinafter, an exemplary production method for the complex oxides A and B will be described.

The production method for the complex oxides A and B includes, for example, a first step of mixing Ni hydroxide with a Li compound and firing the resulting mixture to obtain a complex oxide containing Li and Ni; and a second step of mixing a solution containing a W compound with the complex oxide containing Li and Ni to satisfy a predetermined W content and heating the resulting mixture to obtain a complex oxide containing Li, Ni, and W.

Ni hydroxide in the first step may be a complex hydroxide containing other elements, such as Co and Al, in addition to Ni. Such a complex hydroxide is precipitated (coprecipitated) as a complex hydroxide containing Ni, Co, Al, and the like, for example, by adding an alkaline solution, such as sodium hydroxide, dropwise to an aqueous solution of a Ni salt, a Co salt, an Al salt, and the like while stirring to adjust the pH to the alkaline side (8.5 to 11.5, for example). The Ni salt and the like are not particularly limited, and examples include sulfates, chlorides, and nitrates. The Li compound in the first step is lithium hydroxide or lithium carbonate, for example.

The firing temperature of the mixture in the first step ranges from 500° C. to 900° C., for example, and the firing time ranges from 1 to 20 hours, for example.

In the second step, the solution containing a W compound is mixed with the complex oxide containing Li and Ni to satisfy 5 mol % or more of W relative to the complex oxide in the case of producing the complex oxide A. Meanwhile, in the case of producing the complex oxide B, the solution containing a W compound is mixed with the complex oxide containing Li and Ni in the second step to satisfy 0.5 mol % or less of W relative to the complex oxide.

The solution containing a W compound in the second step is preferably an alkaline solution to facilitate dissolution of the W compound. The W compound is tungsten oxide or a tungstate, for example.

The heating temperature of the mixture in the second step ranges from 100° C. to 300° C., for example, and the heating time ranges from 1 to 20 hours, for example.

Hereinafter, other materials contained in the positive electrode active material layer will be described.

Examples of the conductive agent contained in the positive electrode active material layer include carbon powder, such as carbon black, acetylene black, Ketjen black, or graphite. These carbon powder may be used alone or in combination.

Examples of the binder contained in the positive electrode active material layer include fluoropolymers and rubber polymers. Exemplary fluoropolymers include polytetrafluoroethylene (PTFE), polyvinylidene fluoride (PVdF), and modified polymers thereof. Exemplary rubber polymers include ethylene-propylene-isoprene copolymer and ethylene-propylene-butadiene copolymer. These polymers may be used alone or in combination.

<Negative Electrode>

The negative electrode 12 includes a negative electrode current collector, such as a metal foil, and a negative electrode active material layer formed on the negative electrode current collector. For the negative electrode current collector, a foil of a metal that is stable in a potential range of the negative electrode, such as copper, a film having such a metal disposed as a surface layer, and so forth may be used. The negative electrode active material layer contains a negative electrode active material, a binder, and a thickening agent, for example.

The negative electrode 12 is obtained, for example, by applying a negative electrode mixture slurry containing a negative electrode active material, a thickening agent, and a binder onto a negative electrode current collector, drying to form a negative electrode active material layer on the negative electrode current collector, and rolling the negative electrode active material layer.

The negative electrode active material contained in the negative electrode active material layer is not particularly limited provided that such a material can accommodate and extract lithium ions, and examples include carbon materials, metals that can form alloys with lithium, and alloys or compounds containing such metals. As the carbon materials, coke and graphite, such as natural graphite, non-graphitizable carbon, and artificial graphite, may be used. As the metals that can form alloys with lithium, silicon and tin are preferable, and these metals bonded with oxygen, such as silicon oxide and tin oxide, may also be used. Moreover, a mixture of the above-mentioned carbon material with a silicon or tin compound may be used as well. In addition to the above-mentioned materials, a material having a higher charge/discharge potential relative to metallic lithium than carbon materials and the like, such as lithium titanate, may also be used.

As the binder contained in the negative electrode active material layer, styrene butadiene copolymer (SBR) or modified SBR, for example, may be used although fluoropolymers, rubber polymers, and the like may also be used in the same manner as the case of the positive electrode. As the binder contained in the negative electrode active material layer, fluororesins, AN, polyimide resins, acrylic resins, polyolefin resins, and the like may be used. When a negative electrode mixture slurry is prepared by using aqueous solvents, it is preferable to use styrene-butadiene rubber (SBR), CMC or a salt thereof, polyacrylic acid (PAA) or a salt thereof (PAA-Na, PAA-K, or the like; or may be a partially neutralized salt), or polyvinyl alcohol (PVA), for example.

Examples of the thickening agent contained in the negative electrode active material layer include carboxymethyl cellulose (CMC) and polyethylene oxide (PEO). These thickening agents may be used alone or in combination.

<Nonaqueous Electrolyte>

A nonaqueous electrolyte contains a nonaqueous solvent and an electrolyte dissolved in the nonaqueous solvent. The nonaqueous electrolyte contains a fluorine compound. Here, the fluorine compound contained in the nonaqueous electrolyte may be a fluorine compound contained as the nonaqueous solvent, a fluorine compound contained as the electrolyte, or both. In other words, exemplary embodiments of the nonaqueous electrolyte are (1) an embodiment including a nonaqueous solvent containing a fluorine compound and a fluorine compound-free electrolyte, (2) an embodiment including a fluorine compound-free nonaqueous solvent and an electrolyte containing a fluorine compound, and (3) an embodiment including a nonaqueous solvent containing a fluorine compound and an electrolyte containing a fluorine compound.

Exemplary fluorine compounds as nonaqueous solvents include fluoroethylene carbonate (FEC), 1,2-difluoroethylene carbonate, 1,2,3-trifluoropropylene carbonate, 2,3-difluoro-2,3-butylene carbonate, and 1,1,1,4,4,4-hexafluoro-2,3-butylene carbonate. In particular, FEC is preferable, for example, from a viewpoint of reducing the amount of hydrogen fluoride generated in a high-temperature environment.

The nonaqueous solvent may contain, in addition to the fluorine compound, organic solvents, such as dimethyl carbonate, diethyl carbonate, ethyl methyl carbonate, methyl propyl carbonate, ethylene carbonate, propylene carbonate, butylene carbonate, and vinylene carbonate. These organic solvents may be used alone or in combination.

The fluorine compound as a nonaqueous solvent is preferably contained in a range of 2% by mass or more and 25% by mass or less in the nonaqueous electrolyte. When the content of the fluorine compound falls within the above-mentioned range, deterioration in charge/discharge cycle characteristics and the like of the battery is suppressed in some instances compared with the case in which the content falls outside the range.

The fluorine compound as an electrolyte is preferably a fluorine compound containing Li, such as $LiPF_6$, $LiBF_4$, $LiAsF_6$, $LiSbF_6$, or $LiCF_3SO_3$ but may be a Li-free fluorine compound such as $AgF$, $CoF_2$, $CoF_3$, $CuF$, $CuF_2$, $FeF_2$, $FeF_3$, $MnF_2$, $MnF_3$, $SnF_2$, $SnF_4$, $TiF_3$, $TiF_4$, or $ZrF_4$. These fluorine compounds may be used alone or in combination.

In addition to the fluorine compound, the electrolyte may also contain, for example, a fluorine-free lithium salt, such as $LiClO_4$, $LiAlCl_4$, $LiSCN$, $LiB_{10}Cl_{10}$, $LiCl$, $LiBr$, $LiI$, or $Li_2B_4O_7$. These lithium salts may be used alone or in combination.

The concentration of the electrolyte is preferably set to 0.8 to 1.8 mol/L-nonaqueous solvent, for example.

<Separator>

As the separator 13, an ion-permeable insulating porous sheet or the like is used. Specific examples of the porous sheet include a microporous membrane, a woven fabric, and a nonwoven fabric. A material for the separator 13 is suitably an olefin resin, such as polyethylene or polypropylene; cellulose; or the like. The separator 13 may be a layered structure including a cellulose fiber layer and a thermoplastic resin fiber layer, such as an olefin resin. Moreover, the separator 13 may be a multilayer separator including a polyethylene layer and a polypropylene layer or may be surface-coated with an aramid resin, ceramics, or other materials.

EXAMPLES

Hereinafter, the present invention will be described further by means of Examples. However, the present invention is by no means limited to these Examples.

Example 1

[Preparation of Complex Oxide A]

A complex hydroxide of Ni, Co, and Al was obtained by mixing nickel sulfate, cobalt sulfate, and aluminum sulfate at a molar ratio of 87:9:4 in an aqueous solution, followed by coprecipitation. The complex hydroxide was mixed with lithium hydroxide monohydrate at a molar ratio of 1:1.03, and the resulting mixture was fired at 750° C. for 12 hours to yield a complex oxide containing Ni, Co, and Al.

Subsequently, lithium hydroxide was mixed with tungsten oxide at a molar ratio of 2:1 in an aqueous solution to prepare an aqueous solution containing W. The aqueous solution containing W was mixed with the complex oxide containing Ni, Co, and Al to satisfy 5.5 mol % of W relative to the complex oxide, and the resulting mixture was heated at 120° C. for 12 hours to yield a complex oxide A containing Li, Ni, Co, Al, and W and having W content of 5.5 mol %.

[Preparation of Complex Oxide B]

The above-described aqueous solution containing W was mixed with the above-described complex oxide containing Ni, Co, and Al to satisfy 0.3 mol % of W relative to the complex oxide, and the resulting mixture was dried at 120° C. for 12 hours to yield a complex oxide B containing Li, Ni, Co, Al, and W and having W content of 0.3 mol %.

[Production of Positive Electrode]

The complex oxides A and B were mixed to satisfy a mass ratio of the complex oxide A of 0.002% relative to the total of the complex oxides A and B. The resulting mixture was regarded as a positive electrode active material of Example 1.

A positive electrode mixture slurry was prepared by mixing the positive electrode active material, acetylene black as a conductive agent, and polyvinylidene fluoride as a binder at a mass ratio of 80:10:10 and then adding N-methyl-2-pyrrolidone thereto. Subsequently, the positive electrode mixture slurry was applied to both surfaces of a positive electrode current collector formed of an aluminum foil and dried under vacuum at 110° C. to produce a positive electrode having positive electrode active material layers on both surfaces of the positive electrode current collector.

[Production of Negative Electrode]

A negative electrode mixture slurry was prepared by mixing graphite as a negative electrode active material, sodium carboxymethyl cellulose as a thickening agent, and styrene-butadiene copolymer as a binder at a mass ratio of 98:1:1 and kneading the resulting mixture together with water. Subsequently, the negative electrode mixture slurry was applied to both surfaces of a negative electrode current collector formed of a copper foil, dried under vacuum at 110° C., and then rolled to produce a negative electrode having negative electrode active material layers on both surfaces of the negative electrode current collector.

[Preparation of Nonaqueous Electrolyte Solution]

A nonaqueous solvent was prepared by mixing ethylene carbonate with diethylene carbonate at a volume ratio of 1:1 and adding 2% by mass of fluoroethylene carbonate to the resulting mixed solvent. A nonaqueous electrolyte solution was prepared by dissolving lithium hexafluorophosphate ($LiPF_6$) at a concentration of 1 mol/L in the nonaqueous solvent.

[Production of Battery]

A spiral electrode assembly was prepared by spirally rolling the positive electrode, the negative electrode, and a separator disposed between the positive electrode and the negative electrode. Subsequently, an aluminum positive electrode lead was welded to a part of the positive electrode current collector whereas a nickel negative electrode lead was welded to a part of the negative electrode current collector. The resulting electrode assembly was housed in a flat-bottomed cylindrical case body of 18 mm in diameter and 65 mm in height, and the negative electrode lead and the positive electrode lead were welded to the case body and to a seal, respectively. A nonaqueous electrolyte secondary battery was produced by pouring 5.2 mL of the nonaqueous electrolyte solution through the opening of the case body and sealing the opening of the case body with the seal.

Example 2

The above-described complex oxides A and B were mixed at a mass ratio of the complex oxide A of 0.02% relative to the total of the complex oxides A and B. A nonaqueous electrolyte secondary battery was produced in the same manner as Example 1 except for using the resulting mixture as a positive electrode active material of Example 2.

Example 3

The above-described complex oxides A and B were mixed at a mass ratio of the complex oxide A of 0.04% relative to the total of the complex oxides A and B. A nonaqueous electrolyte secondary battery was produced in the same manner as Example 1 except for using the resulting mixture as a positive electrode active material of Example 3.

Example 4

The above-described complex oxides A and B were mixed at a mass ratio of the complex oxide A of 0.06% relative to the total of the complex oxides A and B. A nonaqueous electrolyte secondary battery was produced in the same manner as Example 1 except for using the resulting mixture as a positive electrode active material of Example 4.

Example 5

The above-described complex oxides A and B were mixed at a mass ratio of the complex oxide A of 0.08% relative to the total of the complex oxides A and B. A nonaqueous electrolyte secondary battery was produced in the same manner as Example 1 except for using the resulting mixture as a positive electrode active material of Example 5.

Example 6

The above-described complex oxides A and B were mixed at a mass ratio of the complex oxide A of 0.1% relative to the total of the complex oxides A and B. A nonaqueous electrolyte secondary battery was produced in the same manner as Example 1 except for using the resulting mixture as a positive electrode active material of Example 6.

Comparative Example 1

A nonaqueous electrolyte secondary battery was produced in the same manner as Example 1 except for using the complex oxide B as a positive electrode active material of Comparative Example 1 without using the complex oxide A.

Comparative Example 2

The above-described complex oxides A and B were mixed at a mass ratio of the complex oxide A of 0.001% relative to the total of the complex oxides A and B. A nonaqueous electrolyte secondary battery was produced in the same manner as Example 1 except for using the resulting mixture as a positive electrode active material of Comparative Example 2.

Comparative Example 3

The above-described complex oxides A and B were mixed at a mass ratio of the complex oxide A of 1.0% relative to the total of the complex oxides A and B. A nonaqueous electrolyte secondary battery was produced in the same manner as Example 1 except for using the resulting mixture as a positive electrode active material of Comparative Example 3.

Comparative Example 4

A nonaqueous electrolyte secondary battery was produced in the same manner as Example 1 except for using the complex oxide A as a positive electrode active material of Comparative Example 4 without using the complex oxide B.

[Measurement of Initial Discharge Capacity]

At an environmental temperature of 25° C., a battery of each Example and Comparative Example was constant-current charged to a battery voltage of 4.2 V at a maximum current of 0.3 It and then charged at a constant voltage of 4.2 V to a current of 0.05 It. Subsequently, the discharge cutoff voltage was set to 2.5 V and the battery was discharged at a constant current of 0.2 It. The discharge capacity on this occasion was regarded as an initial discharge capacity.

[High-Temperature Storage Test]

At an environmental temperature of 25° C., the battery of each Example and Comparative Example after the above-described charging/discharging was constant-current charged to a battery voltage of 4.2 V at a maximum current of 0.3 It. Each battery was then stored at an environmental temperature of 55° C. for 60 days. Subsequently, the discharge cutoff voltage was set to 2.5 V and each battery after the storage was discharged at a constant current of 0.2 It. The discharge capacity on this occasion was regarded as a discharge capacity after high-temperature storage. According to the formula below, a capacity retention ratio was determined for the battery of each Example and Comparative Example. A higher this value indicates further suppressed lowering in capacity during high-temperature storage of the battery.

Capacity retention ratio=(discharge capacity after high-temperature storage/initial discharge capacity)×100

Table 1 shows the capacity retention ratio after high-temperature storage in each Example and Comparative Example.

TABLE 1

|  | Ratio of complex oxide A to total complex oxides A and B | Capacity retention ratio after high-temperature storage |
| --- | --- | --- |
| Ex. 1 | 0.002% | 93.9% |
| Ex. 2 | 0.02% | 94.3% |
| Ex. 3 | 0.04% | 94.0% |
| Ex. 4 | 0.06% | 94.2% |
| Ex. 5 | 0.08% | 94.1% |
| Ex. 6 | 0.1% | 92.8% |
| Comp. Ex. 1 | 0% | 92.1% |
| Comp. Ex. 2 | 0.001% | 92.1% |
| Comp. Ex. 3 | 1.0% | 91.0% |
| Comp. Ex. 4 | 100% | 88.3% |

All the batteries of Examples 1 to 6 exhibit a capacity retention ratio after high-temperature storage higher than the batteries of Comparative Examples 1 to 4. This reveals that, in a nonaqueous electrolyte secondary battery including a positive electrode containing one or more positive electrode active materials, a negative electrode, and a nonaqueous electrolyte containing a fluorine compound, lowering in capacity during high-temperature storage of the battery is suppressed by using the positive electrode active materials that include a complex oxide A containing Li, Ni, and W and having W content of 5 mol % or more and a complex oxide B containing Li, Ni, and W as an optional element and having W content of 0.5 mol % or less and that have a mass ratio of the complex oxide A of 0.002% or more and 0.1% or less relative to the total of the complex oxide A and the complex oxide B.

REFERENCE SIGNS LIST

10 Nonaqueous electrolyte secondary battery
11 Positive electrode
12 Negative electrode
13 Separator
14 Electrode assembly
15 Battery case
16 Case body
17 Seal
18, 19 Insulating plate
20 Positive electrode lead
21 Negative electrode lead
22 Overhang
23 Filter
24 Lower valve
25 Insulator
26 Upper valve
27 Cap
28 Gasket

The invention claimed is:

1. A nonaqueous electrolyte secondary battery comprising: a positive electrode containing one or more positive electrode active materials; a negative electrode; and a nonaqueous electrolyte containing a fluorine compound, wherein:
the positive electrode active materials include a complex oxide A containing Li, Ni, and W and a complex oxide B containing Li, Ni, and W as an optional element;
W content in the complex oxide A is 5 mol % or more;
W content in the complex oxide B is 0.5 mol % or less; and
a mass ratio of the complex oxide A is 0.002% or more and 0.1% or less relative to the total of the complex oxide A and the complex oxide B.

2. The nonaqueous electrolyte secondary battery according to claim 1, wherein a content of the fluorine compound in the nonaqueous electrolyte is 2% by mass or more and 25% by mass or less.

3. The nonaqueous electrolyte secondary battery according to claim 1, wherein the complex oxide A is represented by a general formula of $Li_xNi_{1-y-z}W_yM_zO_{2-\gamma}$ (M is at least one element selected from transition metal elements excluding Ni and W, group 2 elements, and group 13 elements; $0.85 \leq x \leq 1.05$; $0.002 \leq y \leq 0.05$; $0.01 \leq z \leq 0.5$; and $-0.2 \leq \gamma \leq 0.2$.

4. The nonaqueous electrolyte secondary battery according to claim 1, wherein the complex oxide B is represented by a general formula of $Li_xNi_{1-y-z}W_yM_zO_{2-\gamma}$ (M is at least one element selected from transition metal elements excluding Ni and W, group 2 elements, and group 13 elements; $0.85 \leq x \leq 1.05$; $0.002 \leq y \leq 0.05$; $0.01 \leq z \leq 0.5$; and $-0.2 \leq \gamma \leq 0.2$.

* * * * *